Aug. 23, 1966  W. W. SULLIVAN  3,268,887
POSITION SENSING APPARATUS
Original Filed Nov. 12, 1959
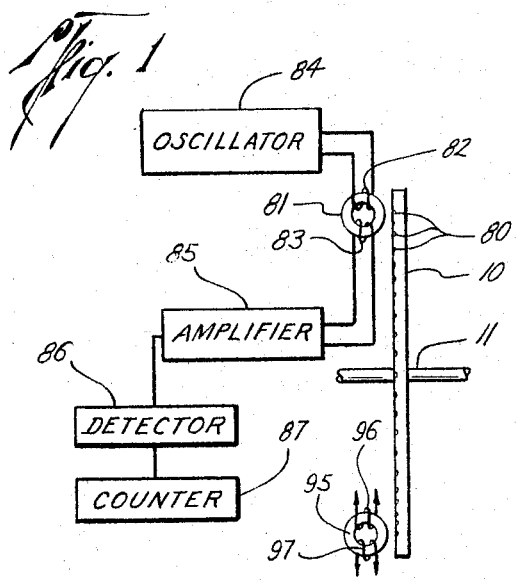
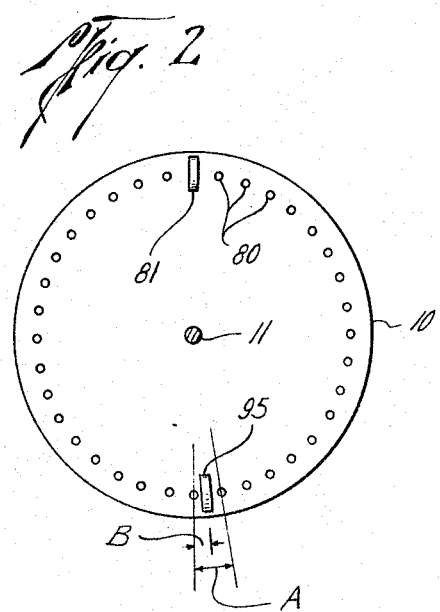
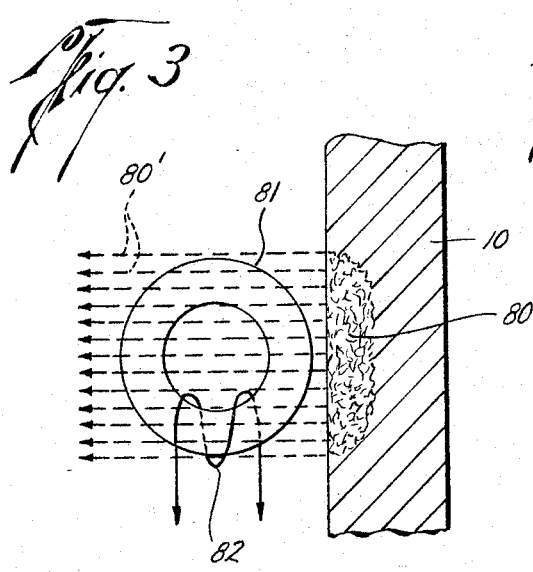
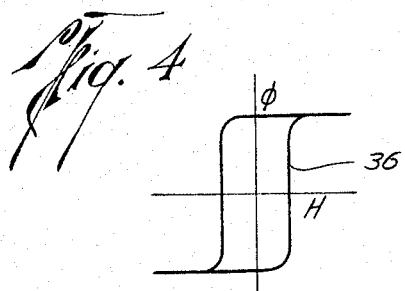
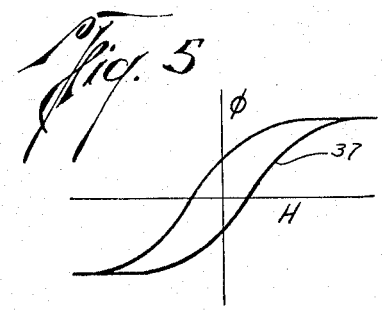
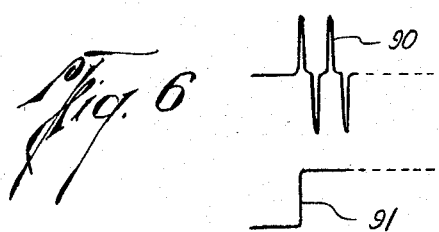
Warren Walter Sullivan
INVENTOR.
BY Michael P. Breston
ATTORNEY 3,268,887
POSITION SENSING APPARATUS
Warren Walter Sullivan, Los Angeles, Calif., assignor to Electro-Mechanical Research, Inc., Sarasota, Fla., a corporation of Connecticut
Original application Nov. 12, 1959, Ser. No. 852,542, now Patent No. 3,113,300, dated Dec. 3, 1963. Divided and this application Aug. 22, 1963, Ser. No. 303,888
2 Claims. (Cl. 340—347)

This application is a division of my co-pending application, Serial No. 852,542 now Patent No. 3,113,300 filed November 12, 1959, and entitled "Position Sensing Apparatus."

This invention relates to apparatus for generating electrical signals representing the position of a movable member and more particularly to electromechanical apparatus for generating electrical signals indicative of the position of a movable member whose position is determined by measuring apparatus.

Measuring apparatus having one or more members which are movable to different positions dependent upon the magnitude of the characteristic being measured, e.g. the force, rate, number, etc., are well known, and it is known also to generate electrical signals dependent upon the positions of such members so that other devices may be operated thereby or so that a remote indication of the magnitude may be provided. However, certain known systems are unsatisfactory for many applications because they require mechanical coupling between the measuring apparatus and the signal generating apparatus or because they cannot be readily adapted to operate with existing measuring apparatus. When mechanical coupling is required, the driving force which operates the measuring apparatus may be inadequate and/or the added load may cause errors in the measurement.

Systems have heretofore been proposed in which magnetic storage members have magnetized areas arranged thereon in spaced coded patterns, and the coded patterns are read-out by conventional magnetic pick-up heads each having an air gap adjacent the storage member. In such systems the storage member is rotated at a predetermined speed, and the electrical signals induced in coils associated with the heads by the magnetized areas on the storage member are indicative of the position of the storage member at the time such signals are induced. The magnetic material of the cores of the heads as well as the volume thereof is such that the magnetic characteristics of such cores are substantially unaffected by the magnetic fields of the magnetized areas on the storage member.

Such systems have several disadvantages: In the first place, the amplitude of the signals is dependent upon the rate of relative motion between the storage member and the heads and, therefore, one or the other must be moved at the rate required to produce useable signal levels. Accordingly, slow rates of movement cannot be used and, if either is driven by a slow speed or a varying speed measuring device, the other must be driven by some additional means. In the second place, the clearances between the heads and the storage member are critical. And, in the third place, if a relatively large output voltage is required, the heads must be mounted close to the storage member, strong magnetization of the storage member areas is required, and the coil associated with the head must be relatively large. The latter requirement reduces the number of heads which may be within a given volume and, hence, reduces the resolution which may be obtained with a device of a predetermined size.

Miniature, re-entrant cores of magnetic material and having magnetic characteristics which vary with the magnetizing force are well known. Generally, such cores are toroidal or annular in shape, but they may have other shapes. Various magnetic materials may be employed to make such cores, and they are commonly made of a ceramic ferrite material or of an extremely thin ferromagnetic alloy, wound tape. Relatively small currents through a small number of turns of wire encircling such a core will cause the core to saturate magnetically.

The magnetic characteristics, e.g. permeability, of the above-mentioned re-entrant cores also will vary when they are subjected to an external magnetic field. This effect is employed in the apparatus of the invention which overcomes the disadvantages of the prior art apparatus described above.

For example, if a voltage varying in amplitude, such as a pulsating or alternating voltage, and of sufficient amplitude to drive the core to saturation, is applied to the winding or coil of a re-entrant magnetic core, the impedance of the winding or coil will have one value when it is not subjected to a magnetic field from another source or when it is in a weak magnetic field from another source and will have a smaller value when it is subjected to a further magnetic field of sufficient strength. Thus, the impedance of the winding may be varied over a considerable range by varying the magnetic field to which the core is subjected.

Similarly, if the core is provided with two or more windings and a pulsating or alternating voltage is applied to one winding, the voltage developed at the terminals of the other winding or windings may be varied over a relatively large range by varying the magnetic field to which the core is subjected from another source.

In accordance with the present invention, a magnetic core having non-linear magnetic characteristics and having one or more windings thereon, and preferably a plurality of such cores, are associated with a member having means for producing a magnetic field, and preferably a plurality of spaced magnetic fields, in such a manner that relative movement of the member and the core or cores causes the core or cores to be subjected to different magnetic fields. The relative positions of the core or cores and the magnetic field producing member are indicated by the signals produced when a pulsating or alternating, preferably the latter, voltage is applied to the winding or windings of the cores.

Preferably, to simplify the application of the voltage to the winding or windings, the core or cores are maintained stationary and the member is moved in accordance with the displacement to be measured, but it will be understood that the core or cores may be moved and the member may remain stationary. Also, it will be apparent from the description of the preferred embodiments of the invention set forth hereinafter that the movement of either member may be relatively slow or fast, regular or irregular, oscillating, unidirectional, circular, linear, etc.

In a preferred embodiment of the invention, a movable magnetic member is provided with a plurality of substantially equally spaced magnetized areas such areas being spaced in the direction of the movement of the member, and at least one saturable core having a winding thereon is mounted adjacent the movable member so that the core is successively subjected to the magnetic field of each magnetized area as the magnetic member is moved. An alternating current of relatively high frequency is supplied to the winding of the core, and when a magnetized area of the movable member is adjacent the core, the voltage at the terminals of the winding is relatively small whereas when the core is intermediate the magnetized areas the voltage at the terminals of the winding is relatively large. Preferably, in this embodiment, in order to indicate direction of movement of the movable member, a second similar saturable core is similarly mounted adjacent the movable member but in a position such that the two cores are not subject to magnetic fields of the same strength at the same time.

It is one object of the invention to provide electrical position indicating apparatus which is simple to construct and manufacture and which does not have the disadvantages of the prior art devices described above.

It is a further object of the invention to provide electrical position indicating apparatus which is simple to assemble and operate, and yet may be relatively small in size.

It is a further object of the invention to provide electrical read-out apparatus which can perform read-out operations at high speeds.

Other objects and advantages of the invention will be apparent from the following detailed description taken in conjunction with the accompanying drawings in which:

FIG. 1 is a schematic, side elevation view, partly in cross-section, of a preferred embodiment of the invention;

FIG. 2 is an end elevation view, partly in cross-section, of a portion of the apparatus shown in FIG. 1;

FIG. 3 is an enlarged, fragmentary, side elevation view of a portion of the embodiment shown in FIG. 1;

FIGS. 4 and 5 are hysteresis curves of magnetic cores which may be employed in the apparatus of the invention; and FIG. 6 shows graphs of voltage wave forms obtainable with the apparatus of the invention.

FIG. 1 illustrates a rotatable member in the form of a disc 10 mounted on a shaft 11. The shaft 11 is rotatable, and hence the disc 10 is rotatable, in relation to the condition to be measured and, therefore, the position of the disc 10 may indicate the magnitude of a force which drives the shaft 11 or the amount that the shaft 11 has been rotated. Since the disc 10 may be relatively small and does not frictionally engage other parts, the disc 10 and the shaft 11 may be rotated easily and at relatively high speeds.

The embodiment shown in FIGS. 1 and 2 is particularly adapted for installations where the shaft 11 and the disc 10 are rotated at relatively high speeds. However, it will be understood that the shaft 11 and the disc 10 may be rotated at slow speeds or intermittently. The disc 10 is provided with a plurality of equally spaced magnetized areas 80 which are all spaced at an equal distance from the axes of rotation of the disc 10.

A saturable, re-entrant magnetic core 81 is mounted adjacent the disc 10 in position to be saturated by the magnetic field of a magnetized area 80 immediately adjacent thereto. The core 81 is provided with a pair of windings 82 and 83; winding 82 is an input winding connected to a source of alternating current as to an oscillator 84. Preferably, the frequency of the alternating current of the source 84 is in the range from 40–200 kilocycles per second and the amplitude of the alternating current is sufficient to drive the core 81 into its region of saturation at peaks of the current of opposite polarity. Preferably, also the strength of the magnetic fields of the magnetized areas is sufficient to drive the core 81 into its region of saturation when such a magnetized area 80 is immediately adjacent to the core 81.

The output winding 83 is connected to an amplifier 85 the output of which is applied to a detector 86. The output of the detector 86 may be applied to the input of a counter or integrating device 87. For reasons which will be explained subsequently, another core 95 is provided having an input winding 96 and an output winding 97.

As previously mentioned, the disc 10 has a plurality of magnetized areas 80 at one face thereof and all such areas may have one polarity at such face. On the other hand, if the magnetized areas are sufficiently spaced the areas may have different polarities. The magnetized areas are polarized and disposed so that the magnetic fields thereof expand substantially perpendicularly from the face of the disc 10.

The magnetized areas 80 may be formed by strips of magnetized material or small permanent magnets mounted on the face of the disc 10 or embedded in the disc 10. However, in the preferred form of the invention, the disc 10 is formed of a material which may be permanently magnetized in small discreet areas, as an example of such material being barium ferrite. Such a disc may be magnetized as illustrated in FIG. 1 by subjecting it to an intense, concentrated magnetic field in the areas to be magnetized, for example, by the use of an electromagnet energized by direct current. The magnetized areas may be at least as small as 0.02 inch in diameter, and if adjacent areas are of the same polarity, the spacing between the areas may be of the same order as the diameter of an area. It has been found that fifty magnetized areas per inch may be produced on a barium ferrite disc permitting a resolution of one-fiftieth of an inch with the apparatus of the invention.

As shown in FIG. 1, cores 81 and 95 are mounted adjacent the face of the disc 10 having the magnetized areas 80 thereon. The dimensions of cores 81 and 95 are of the same order as the dimensions of the smallest magnetized area. Toroidal cores made of a ferrite material having an outside diameter of 0.050 inch, an internal diameter of 0.030 inch, and a thickness of 0.015 inch have been employed for an apparatus of the invention, and such cores have been spaced approximately 0.003 inch from the face of the disc 10.

The number of turns of the windings 82, 83, 96 and 97 depends upon the operating conditions, such as the frequency of the interrogating signal, the magnetic characteristics of the cores, the magnitude of the read-out signal desired, the circuits employed for read-out, etc. In one embodiment of the invention, each core winding consisted of one turn and with a 500 milliampere alternating current having a frequency in the range of 40 kilocycles per second to 200 kilocycles per second flowing through the windings, a one volt read-out signal was obtained when no magnetized area was immediately adjacent a core and a 60–70 millivolt output signal was obtained when a magnetized area was immediately adjacent thereto.

The magnetic cores which are preferred for the apparatus of the invention, are saturable, re-entrant magnetic cores having a so-called "square loop" hysteresis curve of the type illustrated in FIG. 4. In FIG. 4 the horizontal axis indicates the magnetizing force to which the core is subjected, and the vertical axis indicates the magnetic flux produced within the core. As indicated by the horizontal portions of the hysteresis curve 36 shown in FIG. 4, the core saturates when the magnetizing force exceeds a predetermined value. A core having a hysteresis curve of the type shown in FIG. 4, provides high sensitivity and a relatively large amplitude read-out signal. It will be noted that the permeability of a core having a hysteresis curve of the type shown in FIG. 4 varies widely with relatively small changes in magnetizing force.

It is well known that the impedance of a winding around a magnetic core is dependent upon the permeability of the core, and when the permeability is low, the impedance is low and vice versa. Furthermore, if a magnetic core is provided with two windings, it is known also that the voltage produced at the terminals of one of the windings by currents flowing in the other winding is related to the permeability of the core. Thus, if the permeability is small the induced voltage is small and if the permeability is high, the induced voltage is relatively high. Accordingly, if the permeability of a core is non-linearly related to the magnetizing force, the impedance of a winding on the core or the voltage induced in a second winding on the core may be varied in magnitude by changing the magnitude of the magnetizing force to which the core is subjected. Therefore, although a core having a hysteresis loop of the type shown in FIG. 4 is preferred, it will be understood by those skilled in the art that a magnetic core having a hysteresis curve of a different shape may also be employed in the apparatus of the invention. For example, the core may have a hysteresis curve of the type indicated at 37 in FIG. 5.

In the apparatus of the invention, the magnetizing force to which a core is subjected is produced not only by an energized winding around the core, but also by a magnetized area on the disc 10. In the preferred embodiment of the invention, in order to obtain a read-out signal of maximum amplitude, the number of turns in the winding on the core and the amplitude of the interrogating or read-out current are selected to drive the core into its region of saturation at the peaks of the current. Also, the strength of the magnetic field produced by a magnetizing area is sufficient to drive the core into its region of saturation when no current is flowing through the winding and when the area is immediately adjacent the core. However, it will be understood that if a smaller difference between the voltage at the terminals of the winding when no magnetized area is immediately adjacent the core and the voltage at the terminals of the winding when a magnetized area is immediately adjacent the core is acceptable, the ampere-turns of the current through the winding may be less and/or the strength of the magnetic field of the magnetized areas may be less. In other words, the relationship of permeability of the core to magnetizing force, the amplitude of the interrogating or read-out current, the number of turns of the winding and the strength of the magnetic fields of the magnetized areas should be so selected so as to provide a read-out signal of the desired magnitude.

FIG. 3 illustrates the core 81 defining a closed loop magnetic circuit with the magnetized area 80 immediately adjacent thereto. The magnetic field produced by the magnetized area 80 is represented by the lines 80' and it will be noted that the field extends substantially perpendicularly to the face of the disc 10. Consequently no net magneto-motive force is induced in the closed loop magnetic circuit when the core 81 is being magnetized by the flux emanating area 80. It will be recognized that in practice the field lines are not as straight as is shown in FIG. 3 and considerable curvature of the magnetic field lines can be tolerated. It is sufficient in the preferred embodiment of the invention if the field distribution is such that diametrically opposite portions of the core are saturated by the field produced by the magnetized area. It will be noted that the direction of the field produced by the magnetized area in diametrically opposed portions of the core are in the same direction and, therefore, one portion of the core is always saturated when the core is adjacent a magnetized area regardless of the direction of the field in the core produced by the winding thereon.

In operation when no magnetized area 80 is immediately adjacent the core 81, a voltage will be induced in the winding 83 and a direct current voltage will be present at the output of the detector 86. On the other hand, when a magnetized area 80 is immediately adjacent the core 81, substantially no voltage will be induced in the output winding 83 and, therefore, there will be no voltage of significant magnitude in the output of the amplifier and detector 86–87. In sum, when there is no magnetized area 80 immediately adjacent the core 81 a voltage having a wave form of the type illustrated at 90 in FIG. 6 is supplied to the input of the amplifier 85, and the voltage output of the detector 86 has the wave form illustrated at 91 in FIG. 6. However, when a magnetized area 81 is immediately adjacent the core 81 there is substantially no output voltage at the terminals of the winding 83 and therefore, the output of the detector 86 is substantially zero. Accordingly, as the disc 10 is rotated, the voltage at the terminals of the winding 83, and hence at the output of the detector 86, alternately increases to its maximum value and decreases substantially to zero providing a series of spaced voltage pulses at the output of the detector 86. By counting the number of such pulses in a counter 87 the position of the disc 10 with respect to a base or starting position may be indicated by the counter 87. Similarly, by integrating the number of pulses supplied to the counter 87 over a period of time the embodiment of FIG. 1 may be utilized to indicate the speed of rotation of the disc 10.

In some installations it may be desirable to indicate the sense or direction of rotation of the disc 10, and for such installations the embodiment shown in FIG. 1 would be provided with a second saturable, re-entrant magnetic core 95 having a pair of windings 96 and 97 as shown in FIG. 2. In such an installation, the input winding 96 is connected to the output of the oscillator 84 and the output winding 97 as well as the winding 83 of the core 81 are connected to a convenient phase indicating device (not shown).

The core 95 is displaced with respect to the core 81 so that the output signals from the winding 97 are electrically displaced in phase with respect to the signals at the output of the winding 83. In other words, the cores 81 and 95 are positioned so that they are not subjected to the same magnetic fields by magnetized areas 80 at the same time. As illustrated in FIG. 2, the core 95 and the core 81 are disposed adjacent approximately diametrically opposite portions of the disc 10, but the core 95 is displaced with respect to the diametrically opposite portion of the disc 10 a distance B which is some fraction of the distance A between the corresponding points on magnetized areas 80. For example, the distance B may be substantially one-quarter of the distance A. If the spacing B is approximately one-quarter of the distance A the signals produced at the winding 97 will be displaced approximately 90 degrees from the pulses produced at the winding 83, the signals appearing at the terminals of the winding 97 being ahead of or after the signals appearing at the terminals of the winding 83, depending upon the direction of rotation of the disc 10.

Although the core 95 has been shown in a position approximately diametrically opposite the core 81, it will be apparent that other relative positions may be employed as long as the cores 81 and 95 are not subjected to the same magnetic fields by the magnetized areas 80 at the same time.

It will be apparent from the foregoing description of the preferred embodiment of the invention that there is substantially no load on the shaft 11 produced by the position sensing appartus, the shaft 11 being loaded only by the bearings therefor which may be relatively friction free. Dut to the nature and disposition of the magnetic cores as well as the relatively low magnetic fields required for the magnetized areas, the magnetic drag on the disc 10 is substantially negligible. Because the magnetic fields of the magnetized areas 80 extend in the same direction through diametrically opposite portions of the magnetic cores, no pulses or voltages are induced in the windings of the cores when the disc 10 is rotated and hence no spurious pulses are generated regardless of the speed of rotation of the disc 10. Furthermore, it will be noted that the amplitude of the pulses produced for read-out purposes is independent of the speed of rotation of the disc 10 and is substantially constant. Although the apparatus of the invention is advantageous also when the disc 10 is rotated at relatively high speeds, the generation of a constant amplitude output pulse regardless of speed of rotation is of particular advantage when the disc 10 is rotated at relatively low speeds because useable pulses are obtained even though the speed of rotation is relatively low.

Having thus described my invention with particular reference to the preferred forms thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed is:

1. In a position sensing apparatus, a first member having a plurality of substantially equally spaced magnetic flux emanating areas, each of said areas defining a concentration of flux of a predetermined polarity, at least one core member mounted opposite said first member, said core member comprising a closed loop magnetic circuit and being composed at least in part of magnetic material having at least two remanent states, at least a portion of said core member being susceptible of becoming substantially saturated by each of said flux emanating areas dependent upon the relative positions of said core member and said flux emanating areas; said first member and said core member being susceptible of relative displacements; flux inducing means coupled with said core member for switching the magnetic material in said core member between said remnent states dependent upon the relative positions of said core member and said first member; and output means responsive to the flux in said core member for providing signals representative of said predetermined positions.

2. The invention defined in claim 1, including a second core member mounted opposite said first member, said second core member comprising a closed loop magnetic circuit and being composed at least in part of magnetic material having at least two remanent states, at least a portion of said core member being susceptible of becoming substantially saturated by each of said flux emanating areas dependent upon the relative positions of said second core member and said flux emanating areas, second flux inducing means coupled with said second core member for switching the magnetic material in said core member between said remanent states dependent upon the relative positions of said second core member and said first member, said cores being spaced from each other so that one of said cores is immediately adjacent one of said areas when the other of said cores is spaced from one of said areas along said path of movement of said areas a distance substantially equal to one-quarter of the distance between corresponding points of adjacent said areas and the magnetic strength of each of said areas being sufficient to magnetically saturate said cores in predetermined positions of said areas relative to said cores, each of said cores having output windings thereon, and phase indicating means connected to said output windings to indicate the direction of relative movement of said cores and said first member.

References Cited by the Examiner
UNITED STATES PATENTS

| | | | |
|---|---|---|---|
| 2,765,459 | 10/1956 | Winter | 340—347 |
| 2,933,718 | 4/1960 | Arsenault | 340—174 |
| 2,933,721 | 4/1960 | Hagopian | 340—174 |
| 2,938,198 | 5/1960 | Berman et al. | 340—347 |
| 3,123,918 | 3/1964 | Steele | 340—347 |

MAYNARD R. WILBUR, *Primary Examiner.*

DARYL W. COOK, *Examiner.*

A. L. NEWMAN, *Assistant Examiner.*